US012626850B2

(12) United States Patent
Brodeur et al.

(10) Patent No.: US 12,626,850 B2
(45) Date of Patent: May 12, 2026

(54) HOUSING PART, ELECTRICAL SYSTEM AND OPERATING METHOD

(71) Applicant: Hitachi Energy Ltd, Zürich (CH)

(72) Inventors: Samuel Brodeur, St-Bruno (CA); Mattias Viksten, Hudiksvall (SE); Glenn Stromberg, Ludvika (SE); John Richard Tillery, Holly Springs, NC (US); Joakim Johansson, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 691 days.

(21) Appl. No.: 18/023,776

(22) PCT Filed: Sep. 8, 2021

(86) PCT No.: PCT/EP2021/074671

§ 371 (c)(1),
(2) Date: Feb. 28, 2023

(87) PCT Pub. No.: WO2022/058209

PCT Pub. Date: Mar. 24, 2022

(65) Prior Publication Data

US 2023/0326651 A1 Oct. 12, 2023

(30) Foreign Application Priority Data

Sep. 18, 2020 (CN) ......................... 202010987942.9
Sep. 18, 2020 (CN) ......................... 202022057262.5

(51) Int. Cl.
*H01F 27/04* (2006.01)
*H01F 27/02* (2006.01)
(Continued)

(52) U.S. Cl.
CPC ........... *H01F 27/04* (2013.01); *H01F 27/025* (2013.01); *H01F 27/12* (2013.01); *H01F 27/402* (2013.01); *H01F 2027/404* (2013.01)

(58) Field of Classification Search
CPC ........ H01F 27/04; H01F 27/025; H01F 27/12; H01F 27/402; H01F 2027/404
See application file for complete search history.

(56) References Cited

U.S. PATENT DOCUMENTS 3,098,891 A * 7/1963 Delguste ................ H01F 27/12 174/12 R
4,054,351 A * 10/1977 Gallay .................... H01F 27/04 174/18

(Continued)

FOREIGN PATENT DOCUMENTS

CN 101299387 A 11/2008
CN 201503735 U 6/2010

(Continued)

OTHER PUBLICATIONS

Examination Report, IN Patent Application No. 202347016013, mailed Apr. 15, 2025, 6 pages.

(Continued)

*Primary Examiner* — Timothy J. Dole
*Assistant Examiner* — Muhammed Azam
(74) *Attorney, Agent, or Firm* — Sage Patent Group

(57) ABSTRACT

A housing part is configured to be connected to an electric component, to house an electric line, and to be filled with a liquid. The housing part includes an electrically conductive material and has an open mounting side to be connected to the electric component. A surface-to-volume ratio of the housing part is at least 3 m-1, and a ratio of the volume and a wall rupture pressure of the housing part is at least 0.02 m3MPa-1. A corresponding electric system is operated so that, when an electric arc occurs in the housing part, the housing part absorbs a pressure rise that is led into a component tank.

20 Claims, 7 Drawing Sheets

(51) Int. Cl.
*H01F 27/12* (2006.01)
*H01F 27/40* (2006.01)

(56) References Cited

U.S. PATENT DOCUMENTS

| | | | | | |
|---|---|---|---|---|---|
| 4,097,681 | A * | 6/1978 | Spencer | H01F 27/04 174/12 R |
| 4,112,737 | A * | 9/1978 | Morgan | G01N 7/10 73/19.02 |
| 8,890,005 | B2 * | 11/2014 | Berglund | H02G 3/04 174/650 |
| 9,672,969 | B2 * | 6/2017 | Eriksson | H01F 27/04 |
| 9,815,594 | B2 * | 11/2017 | Brodeur | B65D 25/20 |
| 9,899,142 | B2 * | 2/2018 | Zhang | H01F 27/325 |
| 12,073,976 | B2 * | 8/2024 | Czyzewski | H01F 27/29 |
| 2016/0107795 | A1 | 4/2016 | Brodeur | |
| 2023/0326651 | A1 * | 10/2023 | Brodeur | H01F 27/402 336/90 |

FOREIGN PATENT DOCUMENTS

| | | | | |
|---|---|---|---|---|
| CN | 105449536 | A | 3/2016 | |
| CN | 107369537 | A * | 11/2017 | H01F 27/2876 |
| CN | 207097581 | U | 3/2018 | |
| CN | 109524218 | A | 3/2019 | |
| CN | 213277684 | U | 5/2021 | |
| DE | 678650 | C | 7/1939 | |
| JP | S6063907 | A | 4/1985 | |
| JP | H01179407 | U | 12/1989 | |
| JP | 2009539243 | A | 11/2009 | |
| JP | 2010074157 | A | 4/2010 | |
| WO | 2019170642 | A1 | 9/2019 | |

OTHER PUBLICATIONS

Notice of Allowance, CN Patent Application No. 202010987942.9, mailed Jul. 3, 2025, 4 pages.
First Office Action, Chinese Patent Application No. 202010987942.9, mailed Dec. 31, 2024, 6 pages.
Decision to Grant, KR Patent Application No. 10-2023-7008851, mailed Feb. 24, 2025, 6 pages.
Office Action, European Patent Application No. 21773750.1, mailed May 10, 2024, 47 pages.
International Search Report and Written Opinion of the International Searching Authority, PCT/EP2021/074671, mailed Jan. 7, 2022, 11 pages.
"Guide for Transformer Fire Safety Practices", Working Group A2.33, Petersen, et al., Jun. 2013, 139 pages.
"Numerical Method for the Investigation of Fault Containment and Tank Rupture of Power Transformers", IEEE Transactions on Power Delivery, vol. 25, No. 3, Dastous, et al., Jul. 2010, 9 pages.
IP Search for Fire Safety Project- List of Documents, Email, Brodeur, et al., Sep. 2018, 7 pages.
International Preliminary Report on Patentability, PCT/EP2021/074671, mailed Dec. 20, 2022, 6 pages.

* cited by examiner

HOUSING PART, ELECTRICAL SYSTEM AND OPERATING METHOD

CROSS-REFERENCE TO RELATED APPLICATIONS

This application is a 35 U.S.C. § 371 national stage application of PCT International Application No. PCT/EP2021/074671 filed on Sep. 8, 2021, which in turn claims foreign priority to Chinese Application No. 202010987942.9, filed on Sep. 18, 2020, also which in turn claims foreign priority to Chinese Application No. 202022057262.5, filed on Sep. 18, 2020 the disclosures and content of which are incorporated by reference herein in their entirety.

TECHNICAL FIELD

A housing part for an electrical system and such an electrical system are provided. Further, an operating method for such an electrical system is also provided.

BACKGROUND

Electric arcs may occur within electrical systems, such as transformers. Electric arcs occurring within a housing part of an electrical system may cause pressure to increase therein, potentially damaging the housing part and other components.

SUMMARY

An object to be achieved is to provide a housing part that can resist the pressures resulting from electric arcs occurring therein.

This object may be achieved, inter alia, by a housing part, by an electrical system and by an operating method as specified in the independent claims. Exemplary further developments constitute the subject matter of the dependent claims.

For example, the housing part is filled with transformer oil and is mechanically strengthened in such a way that a pressure rise due to an electric arc is absorbed and led into a greater component to that the pressure rise is deflected by the housing part, before the pressure rise can cause rupture or significant leakage of the housing part. Thus, damage to the housing part and also to surrounding equipment, for example, caused by fire due to rupture or leakage of the housing part, can be prevented.

In at least one embodiment, the housing part is configured to be connected to an electric component, like a transformer or a shunt reactor, and is configured to house an electric line. Moreover, the housing part is configured to be filled with a liquid, wherein the housing part comprises an electrically conductive material. The housing part has an open mounting side to be connected to the electric component. A surface-to-volume ratio of the housing part is at least 3 $m^{-1}$, and a ratio of the volume and a wall rupture pressure of the housing part is at least 0.02 $m^3$ $MPa^{-1}$.

For example, the housing part is a turret to be mounted on a transformer or shunt reactor. The liquid may be a transformer oil configured to provide more efficient cooling than air.

The electrically conductive material may be at least one metal, for example steel, like stainless steel.

The open mounting side is, for example, a bottom side of a cylinder that forms the housing part. Accordingly, at the open mounting side the housing part comprises an aperture so that the mounting side is, for example, to at least 60% or 80% or 90% free of any solid material. Remaining areas of the mounting side may be formed of a material to rest on the electric component on which the housing part is mounted.

The open mounting side may be of plain fashion so that the housing part can rest on an even surface of the electric component. Otherwise, the open mounting side may comprise a structuring to improve connectivity with the electric component. Such a structuring may be formed, for example, by an indentation, by an adaptor or by a fit ring.

The surface-to-volume ratio of the housing part is comparably large. Thus, the surface-to-volume ratio could be at least 3 $m^{-1}$ or at least 4 $m^{-1}$ or at least 5 $m^{-1}$. As an option, the surface-to-volume ratio may be at most 9 $m^{-1}$ or at most 10 $m^{-1}$ or at most 11 $m^{-1}$. The surface of the housing part relevant to determine the surface-to-volume ratio may be an interior surface of the housing part excluding an area of the opening in the mounting side, or the relevant surface may also be an exterior surface of the housing part, again not taking into account the area of the opening in the mounting side.

For example, if the housing part has the shape of a hollow cylinder, the relevant surface is an area of a cylinder barrel plus an area of a top side of the cylinder, assuming that a bottom side of the cylinder is completely open; when the cylinder has a height H and a radius R, then in this case the relevant surface is $2\square RH+\square R^2$. In another example, the housing part has the shape of a cuboid with a height H and a width W and a length K, then the relevant surface is 2H(L+K)+KL, again assuming that a bottom side of the cuboid is completely open.

Further assuming that a wall thickness of the housing part is small compared with its diameter, it is noted that the exterior surface and the interior surface of the housing part are approximately the same. 'Small compare with' can mean that there is a at least a factor of 50 or 100 between the wall thickness and the diameter. If the housing part is not of round fashion, the diameter may be calculated as the square root of four times an area of the housing part in said plane divided by □.

The ratio of the volume and a wall rupture pressure of the housing part may be at least 0.01 $m^3$ $MPa^{-1}$ or at least 0.02 $m^3$ $MPa^{-1}$ or at least 0.04 $m^3$ $MPa^{-1}$ or also at least 0.05 $m^3$ $MPa^{-1}$. As an option, the rupture pressure is at most 2 $m^3$ $MPa^{-1}$ or at most 1 $m^3$ $MPa^{-1}$ or at most 0.4 $m^3$ $MPa^{-1}$ or at most 0.3 $m^3$ $MPa^{-1}$. That is, the housing part has a high mechanical strength against rupture due to internal pressure.

By means of the aforementioned values, on the one hand a sufficiently stable housing part can be achieved, while on the other hand mechanical load to the electric component as well as manufacturing costs can be kept comparably low and high manageability can be achieved. Accordingly, for example, the surface-to-volume ratio may be between 3 $m^{-1}$ and 9 $m^{-1}$ inclusive, and the ratio of the volume and the wall rupture pressure of the housing part may be between 0.04 $m^3$ $MPa^{-1}$ and 2 $m^3$ $MPa^{-1}$ inclusive. For example, for straight turrets this value may be between 0.04 $m^3$ $MPa^{-1}$ and 0.6 $m^3Mpa^{-1}$ inclusive, for external or side turrets this value may be between 0.4 $m^3$ $MPa^{-1}$ and 1.5 $m^3$ $MPa^{-1}$ inclusive, and for cable boxes this value may be between 0.1 $m^3$ $MPa^{-1}$ and 1 $m^3$ $MPa^{-1}$ inclusive, to ensure both sufficient mechanical strength and manageability.

The rupture pressure may be the interior pressure of the housing part at which the hull of the housing device begins to disintegrate and begins to fracture and crack. The rupture pressure can be calculated, for example, by means of a finite element method, FEM for short, or may also be measured.

Accordingly, the housing part may be a reinforced turret for electrical equipment.

A high-energy internal electric arc in an oil-filled turret can create an extreme sudden pressure rise because of the small volume of the turret, and rupture may be accompanied by large oil spill and fires. The housing part, for example, the oil-filled reinforced turret described herein is designed to resist this large pressure rise without rupture and significant oil leak. Turret design modifications are, for example, thicker turret shells of steel or stainless steel, flanges, and stronger bolt connections. Then, the pressure rise is transferred to the electric component, for example, the transformer main tank, which is configured to absorb energy injected by elastic-plastic deformation. It is noted that the internal tank pressure in the electric component is much lower because of its large volume. This safety feature could prevent turret rupture and fires.

In addition, this reinforced design solution is applicable to other oil-filled small compartments such as cable terminations, cable boxes and side turrets like chimneys. This design may also apply to an on-load tap charger cover, OLTC cover for short, and to connections to the transformer tank.

Transformer turrets in which there is a bushing end and/or a bushing shield, cable terminations and cable boxes are the second most cause of fires in the case of internal electric arcing. An arcing peak pressure rise in such a small oil volume could be up to 10 times higher in comparison to the same event located in the main transformer tank.

One might think that a pressure relief valve could be the solution, but several studies reveal that such valves are not effective because of their comparably slow reaction time and small diameter. Other alternatives would be to avoid transformer designs with oil-filled turrets, cable terminations and cable boxes, or to use a large opening pressure relief device at a top cover of the transformer. However, these alternatives may come with reduced breakdown voltage or with an increased danger of oil spills.

The housing part described herein is intended to resist a specific internal arc energy and the related pressure. Thicker turret shells and flanges can provide better mechanical resistance to withstand rupture. A bigger bolt size including higher tightening torque and thicker turret flanges can prevent potential oil leakage. All these design changes can be a result of calculations and of a nonlinear finite element analysis. Said specific internal arc energy is, for example, 20 MJ or 30 MJ.

Once the pressure is contained in the turret, it will be transferred to the transformer main tank. The tank is going to deform to absorb this extra arcing gas volume. Tank displacement and resistance may be ensured by nonlinear finite element analysis.

As an example, the following modifications on a 930 mm diameter straight turret are performed:

- a turret shell thickness is increased from 5 mm to 8 mm, wherein the use of stainless steel could also be effective,
- turret flange and tank cover flange thicknesses are increased from 18 mm to 50 mm,
- a turret cover thickness is increased from 28 mm to 50 mm,
- a turret bolt size is increased from M12 to M36,
- a bolts tightening torque is increased from 84 Nm to 2400 Nm.

The turret could also be equipped with a pressure relief valve. The shape of the valve can be straight, or can be of an elbow or chimney type. The same principle could also be applied to other oil-filled small compartments such cable terminations and cable boxes.

The housing part and the design principles described herein can be applied, for example, to

- single phase distribution transformers,
- medium distribution transformers configured for 315 kVA up to 2499 kVA,
- low-voltage variable speed drive transformers configured for a secondary voltage of at most 1.0 kV,
- industrial transformers,
- shell transformers,
- OLTC, vacuum or conventional,
- large-to-medium distribution transformers configured for more than 2499 kVA,
- small distribution transformers configured for up to 315 kVA,
- small power transformers,
- high-voltage direct current transformers, and/or
- reactors like shunt reactors.

According to at least one embodiment, the housing part is a turret configured to be added to a transformer or also to a shunt reactor as the electric device. Thus, the electric line may be a high-power line or a high-voltage line configured to be applied with a voltage of at least 16 kV or of at least 100 kV, for example.

Further, an electric system is provided. The electric system comprises a housing part as indicated in connection with at least one of the above-stated embodiments. Features of the electronic system are therefore also disclosed for the housing part and vice versa.

In at least one embodiment, the electric system comprises one or a plurality of the housing parts. By means of the at least one housing part, the electric system may be provided with one or with a plurality of electric power lines. The electric system also comprises an electric component like a transformer or a shunt reactor, having at least one component tank. The at least one housing part is mounted to the component tank by the open mounting side so that an interior of the component tank is connected with an interior of the at least one housing part at the corresponding open mounting side. A volume of the component tank exceeds the volume of the housing part by at least a factor of 3 or by at least a factor of 10 or by at least a factor of 100.

According to at least one embodiment, the housing part comprises a top side opposite the open mounting side. For example, the top side comprises at least one aperture to feed through the at least one electric line that is housed by the housing part.

According to at least one embodiment, the housing part comprises a side wall. The side wall connects the top side and the open mounting side. The side wall may be of a one-piece fashion or of a multi-piece fashion. As an option, the top side is thicker than the side wall.

According to at least one embodiment, the side wall and/or the top face is of a metal having a modulus of elasticity of at least 150 GPa or of at least 190 GPa at room temperature. For example, the top face and/or the side wall are made of steel or stainless steel.

According to at least one embodiment, a wall thickness of the side wall is at least 5 mm or at least 6 mm or at least 7 mm. As an option, the wall thickness is at most 20 mm or at most 14 mm or at most 10 mm.

According to at least one embodiment, the side wall is composed of at least two elements, for example, of two elements or of three elements. These elements may be of identical or different design.

According to at least one embodiment, the side wall elements are connected by means of intermediate flanges located along the side wall between the top side and the open mounting side. Hence, in the case of two elements, each one of the side wall elements can comprise one intermediate flange; in the case of three and more elements, the at least one middle part comprises two intermediate flanges, and the two end elements each comprise one intermediate flange.

According to at least one embodiment, the intermediate flanges mechanically strengthen the side wall. Thus, the intermediate flanges can be reinforcing rings that thicken the side wall in the respective locations. For example, at the intermediate flanges the wall thickness of the side wall is increased by at least a factor of 3 and/or by at most a factor of 7, compared with remaining areas of the side wall that are free of any flanges or the like.

According to at least one embodiment, the electric line housed by the housing part is connected to a bushing of the electric component. By means of the bushing, the electric line may be electrically connected to a cable or electric line of the electric component, for example, to an interior power line.

According to at least one embodiment, the bushing and/or the interior power line of the electric component protrudes out of the component tank. The bushing and/or the interior power line may terminate within the housing part. Thus, the housing part may also house the bushing.

According to at least one embodiment, the bushing comprises a shield. By means of the shield, an end of the electric line fed through the housing part is clutched. Optionally, said end of the electric line and an end of the interior power line of the electric component are clutched and/or coupled and/or connected by means of the shield and/or by means of the bushing.

According to at least one embodiment, the intermediate flanges run, or at least one of the intermediate flanges runs, around the bushing, the shield and/or cable on an exterior face of the side wall. Hence, the intermediate flanges can provide mechanical strengthening at or near a location at which there is the highest probability of an electric arc occurring.

According to at least one embodiment, a diameter and/or a length of housing part is/are at least 0.3 m or at least 0.7 m or at least 1 m. Optionally, said diameter and/or said length of housing part is/are at most 10 m or at most 7 m or at most 3 m. The length may be determined along a direction perpendicular with the open mounting side. The diameter may be determined in a plane in parallel with the open mounting side.

According to at least one embodiment, a minimum distance between the side wall of the housing part and the electric line housed in the housing part and/or the component interior line and/or the bushing and/or the shield is at least 0.1 m or at least 0.2 m or at least 0.3 m. Alternatively or additionally, said distance is at most 0.5 m or 0.4 m or 0.3 m. For example, said distance is between 0.2 m and 0.3 m inclusive. Hence, a diameter of the housing part is comparably large in order to reduce an internal arc risk. This distance may completely be filled with the liquid, before the electric arc occurs.

According to at least one embodiment, the volume of the component tank is at least 12 $m^3$ or at least 15 $m^3$ or at least 25 $m^3$. As an option, said volume is at most 220 $m^3$ or at most 170 $m^3$ or at most 100 $m^3$. Said volume may be the entire volume enclosed by the component tank. Hence, the actual volume of the liquid that fills the component tank may be smaller. For example, the volume of the liquid in the component tank is at least 3 $m^3$ or at least 10 $m^3$ or at least 20 $m^3$ and/or is at most 80 $m^3$ or at most 40 $m^3$.

According to at least one embodiment, the liquid that fills the housing part and also the component tank is transformer oil. The transformer oil may be a silicone-based oil or a mineral oil.

According to at least one embodiment, the housing part further comprises at least one bottom flange. The bottom flange, or the bottom flanges, can surround the open mounting side. Like the intermediate flanges, the bottom flange can be a thickened portion of the side wall at the very end of the side wall at the open mounting side. The housing part can be mounted to the component tank by means of the bottom flange.

According to at least one embodiment, the housing part further comprises at least one top flange. The top flange, or the top flanges, may be located on a side of the side wall remote from the open mounting side, that is at the side wall near the top side.

According to at least one embodiment, at least one cover of the housing part forms the top side. The cover or the covers and, hence, the top side can comprise at least one cover flange. The at least one cover is fastened to the side wall by means of the at least one top flange and the at least one cover flange. Like the intermediate flanges and the bottom flange, the top flange can be a thickened portion of the side wall, located at the very end of the side wall at the top side.

According to at least one embodiment, a ratio of a thickness of the intermediate flanges and the wall thickness of the side wall is at least 4 or is at least 5. Alternatively or additionally, this ratio is at most 15 or at most 10. Hence, to avoid leakage of the liquid at the intermediate flange, said flange is designed comparably strong. The same may apply to a ratio of a thickness of the top flange and the wall thickness of the side wall and/or to a ratio of a thickness of the cover flange and the wall thickness of the side wall and/or to a ratio of a thickness of the bottom flange and the wall thickness of the side wall.

According to at least one embodiment, the cover comprises at least one lead-through opening, the electric line is fed into the housing part through the lead-through opening. Hence, the lead-through opening in the cover corresponds to the aperture of the top side.

According to at least one embodiment, at least one of the intermediate flanges, of the bottom flange and the component tank, and of the top flange and the cover flange are flanged together with a tightening torque of at least 0.5 kNm or at least 1 kNm or at least 2 kNm. As an option, the tightening torque is at most 3 kNm or at most 5 kNm. Hence, bolts that connect the respective flanges are torqued with a comparably high moment of force.

Further, an operating method for an electric system is provided. The electric system is designed as indicated in connection with at least one of the above-stated embodiments. Features of the electronic system and of the housing part are therefore also disclosed for the operating method and vice versa.

In at least one embodiment, the operating method for the electric system comprises:

when an electric arc occurs in the housing part, the housing part absorbs a pressure rise due to the electric arc, the pressure rise is led from the housing part into the component tank through the open mounting side, wherein the housing part withstands the pressure rise during the time required to deflect the pressure rise to the component tank without rupture, and upon receiving the pressure rise, the component tank deforms and contains the pressure rise so that no or no significant damage happens to the electric component and the housing part.

Hence, oil spill and resulting fires can be prevented.

According to at least one embodiment of the method, a travelling time of the pressure rise from a location of the electric arc to the open mounting side within the housing part is smaller than a full build-up time of the pressure rise and/or of the electric arc. For example, the maximum pressure and/or volume expansion and/or the full electric arc is established after at least 20 ms or after at least 35 ms of the beginning of the electric arc. However, the travelling time that the pressure rise needs in the liquid to reach the open mounting side is at most 20 ms or at most 10 ms. Hence, the pressure rise is released in part to the larger component tank before the pressure rise can fully deploy its destructive effect in the housing part having the comparably small volume.

According to at least one embodiment of the method, the electric arc occurs at or near the bushing and/or the shield. For example, a distance between a current carrying part fed through the housing part and the side wall of the housing part is smallest near the bushing and/or the shield.

A housing part, an electric system and an operating method described herein are explained in greater detail below by way of exemplary embodiments with reference to the drawings. Elements which are the same in the individual figures are indicated with the same reference numerals. The relationships between the elements are not shown to scale, however, but rather individual elements may be shown exaggeratedly large to assist in understanding.

DETAILED DESCRIPTION

Figure 1:
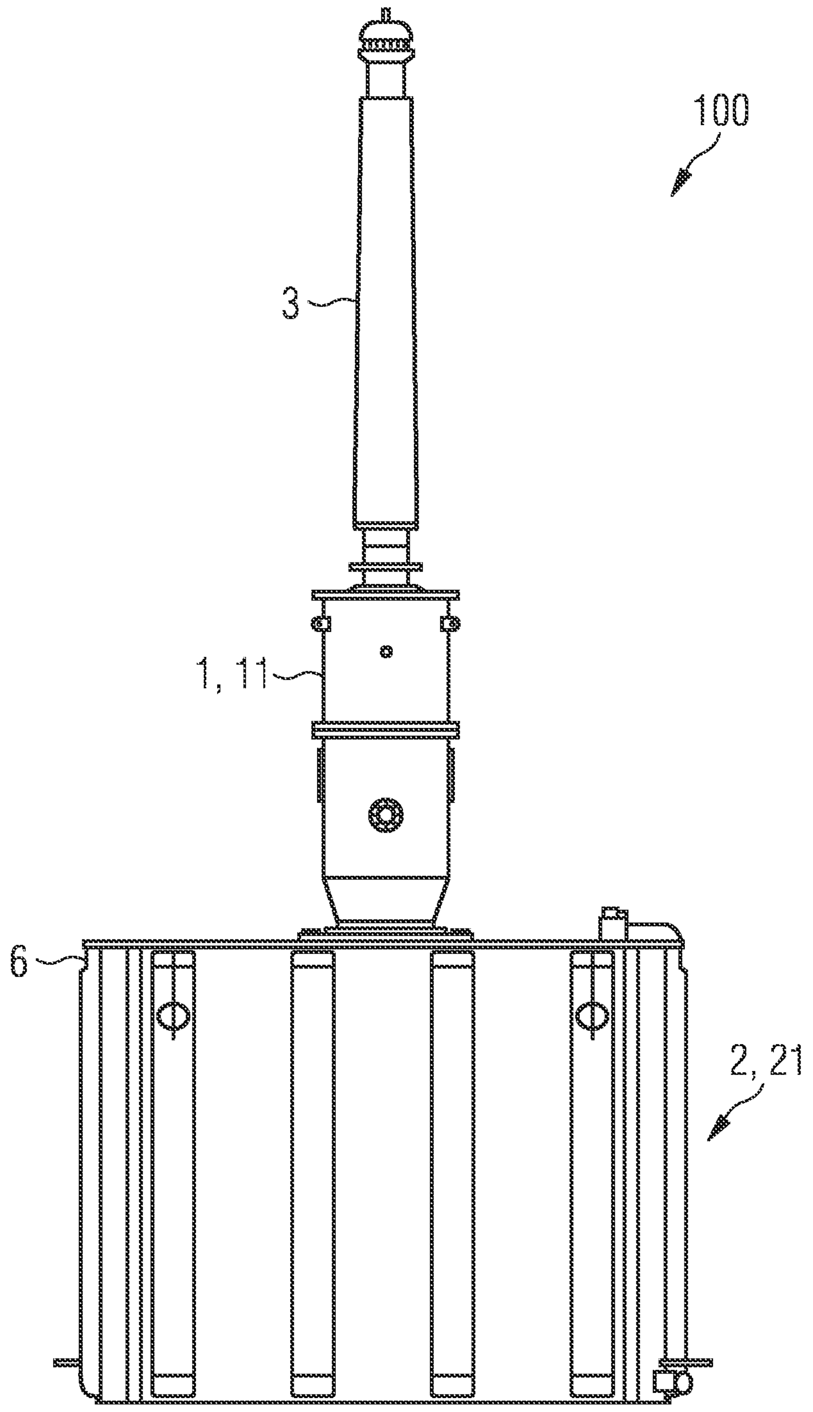
FIG. 1 is a schematic side view of an exemplary embodiment of an electric system described herein.

FIGS. 1 to 5 illustrate an exemplary embodiment of an electric system 100 comprising an exemplary embodiment of a housing part 1. The electric system 100 also comprises an electric component 2 that is, for example, a transformer 21 or, as an alternative, a shunt reactor. An electric line 3 is provided to the electric device 2 through the housing part 1. Hence, the housing part 1 may be a top turret 11 mounted on the electric component 2.

Figure 2:
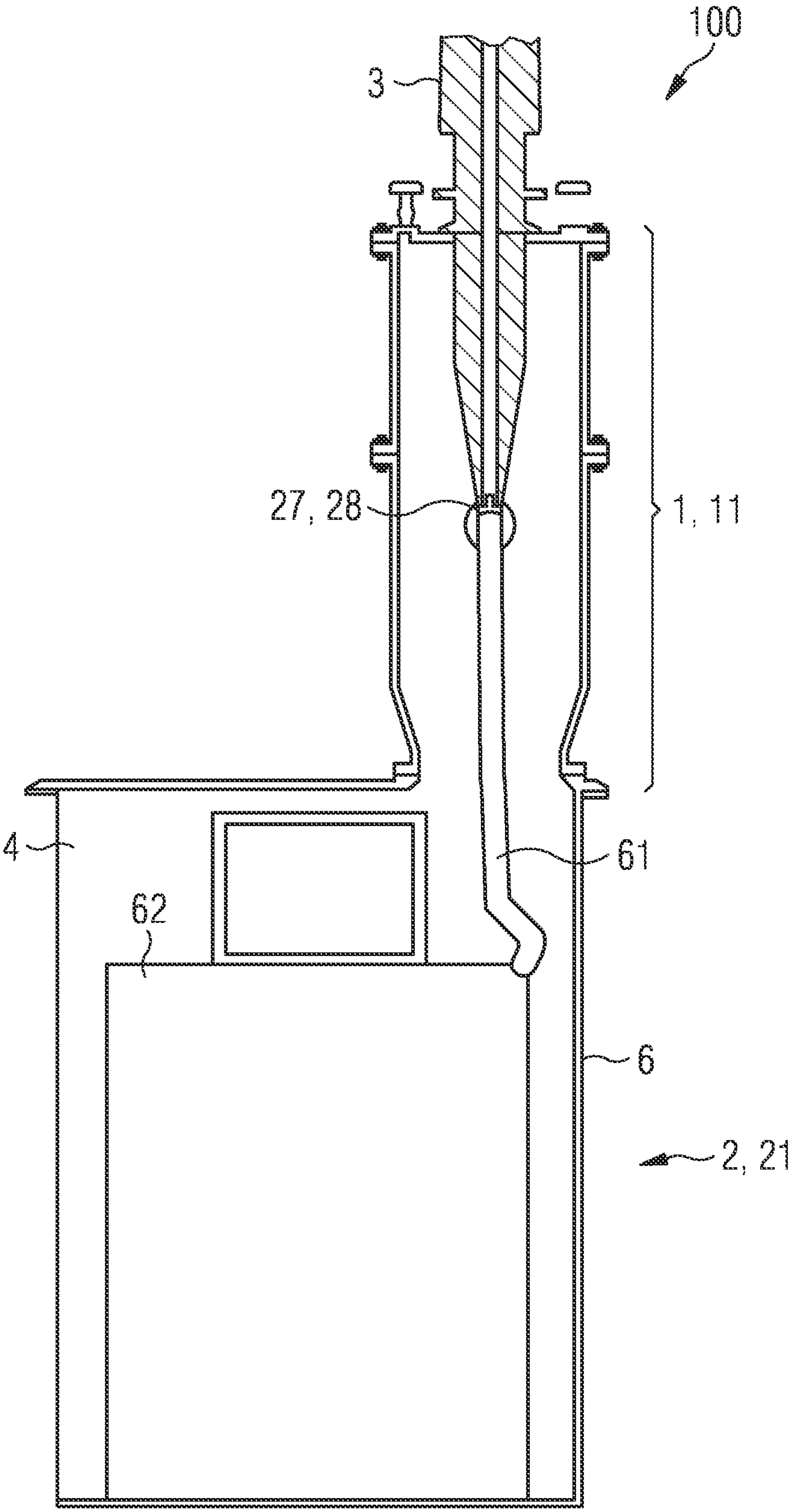
FIG. 2 is a schematic sectional view of the electric system of FIG. 1.

The electric component 2 comprises a component tank 6 in which a base element 62 is located, see FIG. 2. The component base element 62 includes, for example, transformer windings and a transformer core. Further, the electric component 2 comprises an interior line 61 by means of which current is fed to the component base element 62. For example, the component interior line 61 is a high-power line and is configured to carry high voltages. The component tank 6 as well as the housing part 1 are filled with a liquid 4, for example, a transformer oil.

Figure 3:
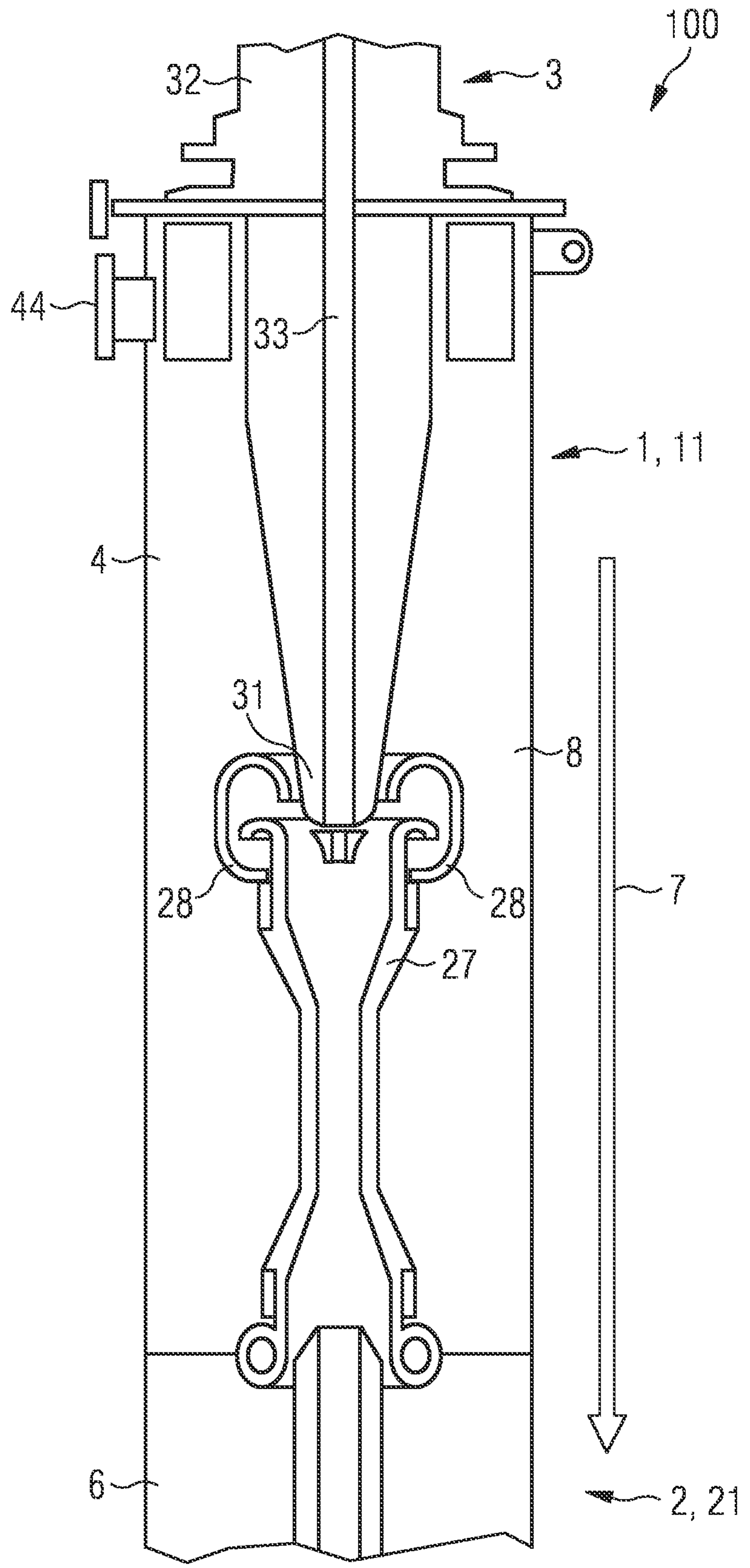
FIG. 3 is a detail of the schematic sectional view of the electric system of FIG. 2.

As can be seen from FIGS. 2 and 3, the electric line 3 is connected to the component interior line 61 by means of a bushing 27, for example. At an end 31 of the electric line 3, optionally there is a shield 28 of the bushing 27 that clamps the electric line 3. Said shield 28 may be located in the middle or approximately in the middle of the housing part 1, seen along a direction perpendicular to an open mounting 51 side of the housing part 1. For example, the electric line 3 comprises an electrically conductive core 33 and an electric insulation 32 around the core 33 that runs up to the end 31.

In the region of the end 31, see FIG. 3, a distance between the bushing 27 of the shield 28 that are configured to carry current on the one hand, and the electrically conductive housing part 1 on the other hand, is comparably small. Thus, in this region there is the highest probability that an electric arc 8 may occur. Hence, the electric arc 8 may occur in a comparably narrow area of the housing part 1 and also within a relatively small volume defined by the housing part 1.

Because of the electric arc 8, the liquid 4 decomposes in the region of the arc 8 and a rapid pressure rise 7 occurs in the small volume in the housing part 1, compare also FIGS. 11 and 12 below. By means of the mechanically comparably strong housing part 1, the pressure rise 7 is deflected into a by far larger volume of the component tank 6. Hence, the pressure rise 7 can be absorbed in the component tank 6 and harm to the electric system 100, for example, due to fires resulting from a spill of the liquid 4 and of gases out of the housing part 1, can be prevented.

Figure 4:
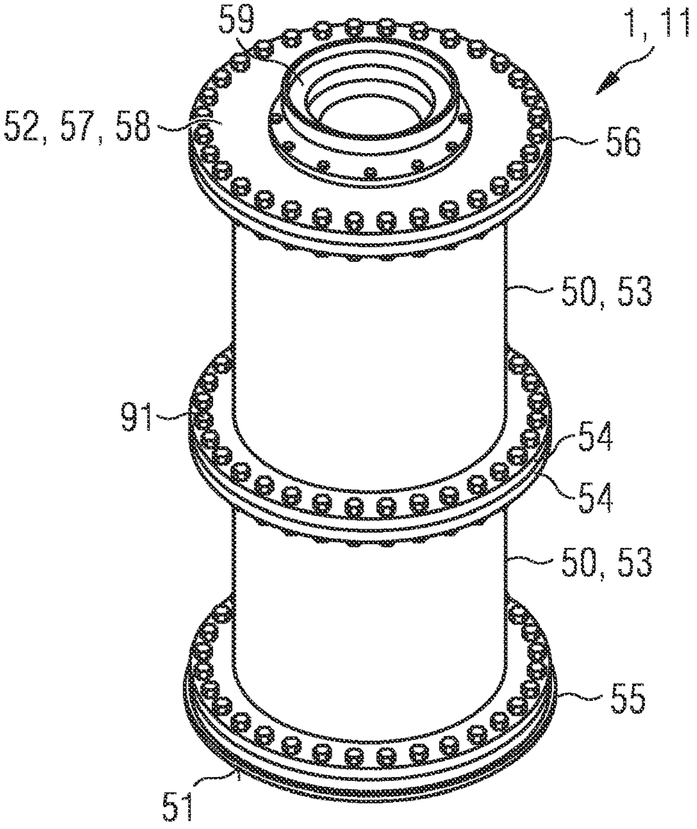
FIG. 4 is a schematic perspective view of a housing part of the electric system of FIG. 1.
Figure 5:
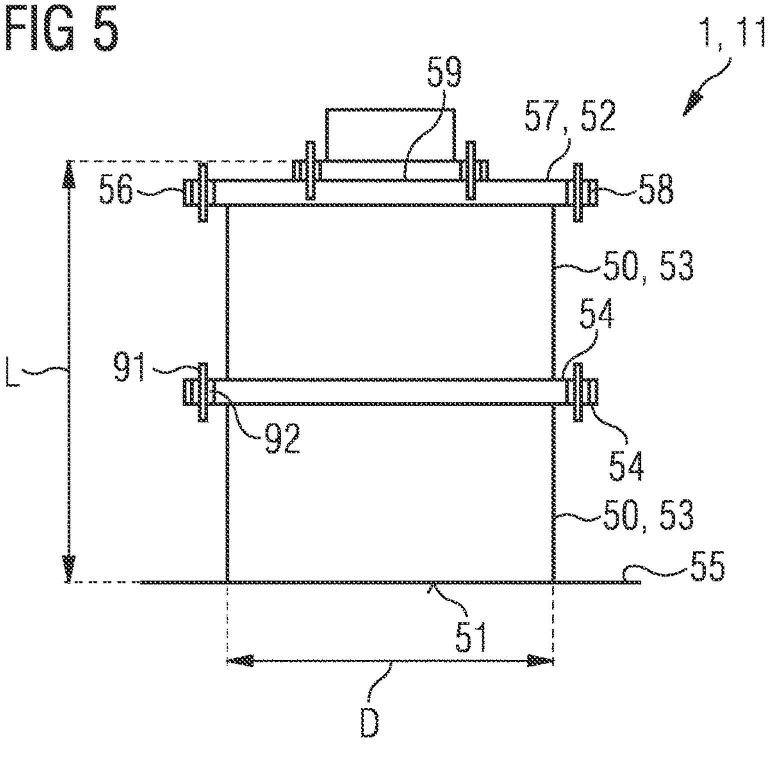
FIG. 5 is a schematic sectional view of the housing part of FIG. 4.

Accordingly, see FIGS. 4 and 5, the housing part 1 is constructed in a mechanically stable manner. However, attention has to be paid to ensure that the housing part 1 is not oversized concerning its mechanical properties in order to avoid too much mechanical load to the component tank 6 and in order to keep costs relatively low.

In this exemplary embodiment, the housing part 1 has, in principle, the shape of a hollow cylinder. A mounting side 51 of the housing part 1 facing the component tank 6 is essentially open, so that a diameter of an opening at the mounting side 51 corresponds to an inner diameter of the hollow cylinder. Hence, the opening at the mounting side 51 is as large as possible.

A top side 52 of the housing part 1 may be formed of a cover 57. As an option, atop the cover 57 there is a further element of the housing part 1 in order to mount the electric line 3. Thus, by means of the further element a lead-through opening 59 is defined at the top side 52.

The top side 52 and the open mounting side 51 are connected by a side wall 53. As an option, the side wall 53 is of multi-piece design so that the side wall 53 is composed of two elements 50. The elements 50 can be of the same design or can have different shapes. For example, the elements 50 of the side wall 53 are tubes having flanges 54, 55, 56 at their respective ends.

Thus, at the open mounting side 51 there is a bottom flange 55, at an interface between the elements 50 of the side wall 53 there are two intermediate flanges 54, and at the top side 52 there is a top flange 56 of the topmost element 50 of the side wall 53 and a cover flange 58 of the cover 57. All the flanges 54, 55, 56, 58 can be formed integrally with the respective elements 50, 57 and may constitute rings or rims at the end of the tubes that form the elements 50 of the side wall 53. The flanges 54, 55, 56, 58 may be connected by means of bolts 91 and by means of an O-ring 92 between each one of the elements 50, the cover 57 and the component tank 6. The O-rings 92 may be of a rubber or also of a metal.

As an option, the intermediate flanges 54 are located close to the end 31 of the electric line 3 and, thus, near the shield 58 of the bushing 57. Hence, the intermediate flanges 54 may serve as a mechanical strengthening of the side wall 53. Moreover, the probable electric arc position is relatively close to the open mounting side 51 so that the pressure rise 7 can be led into the larger component tank 6 within a short period of time.

The liquid 4 may fill, for example, 60% to 75% of a total internal volume of the housing part 1, the remaining space within the housing part 1 is occupied by the electric line 3, the bushing 27 and the component interior line 62. The same may apply to the component tank 6 relative to the component interior line 61 and the component base element 62.

Optionally, the following parameters apply to the housing part 1, individually or in any combination, for example, with a tolerance in each case of at most a factor of 1.5 or at most a factor of 1.3 or at most a factor of 1.1:

- A wall thickness of the tubes that constitute the elements 50 of the side wall 52 is 8 mm.
- The elements 50 of the side wall 53 and the cover 57 are made of a material having a Young's modulus of 200 GPa, for example, of steel of or stainless steel.
- The flanges 54, 55, 56 and/or 58 and, thus, the cover 57, have a thickness of 50 mm. For example, the flanges 54, 55, 56, 58 may be in accordance with ANSI B16.47 Class 150, or in accordance with a similar class.
- The bolts 91 are M36 bolts, for example, in accordance with ISO 898 Class 8.8.
- A tightening torque to the bolts 91 is 2400 Nm.
- A diameter of the elements 50 of the side wall 53, for example, an inner diameter, is 930 mm.
- A length of the housing part 1, for example, including the cover 57 but excluding the further element atop the cover 57, is 2.3 m.

Thus, the housing part 1 may have a surface-to-volume ratio of about 4.7 $m^{-1}$, and a ratio of the volume and a wall rupture pressure r of the housing part 1 may be about 0.17 $m^3$ $MPa^{-1}$.

As an option, a valve 44 may also be present, for example, at the side wall 53 of the housing part 1. However, such a pressure relief valve 44 is typically too slow to allow the pressure rise 7 caused by the electric arc 8 to be relieved in time.

Figure 6:
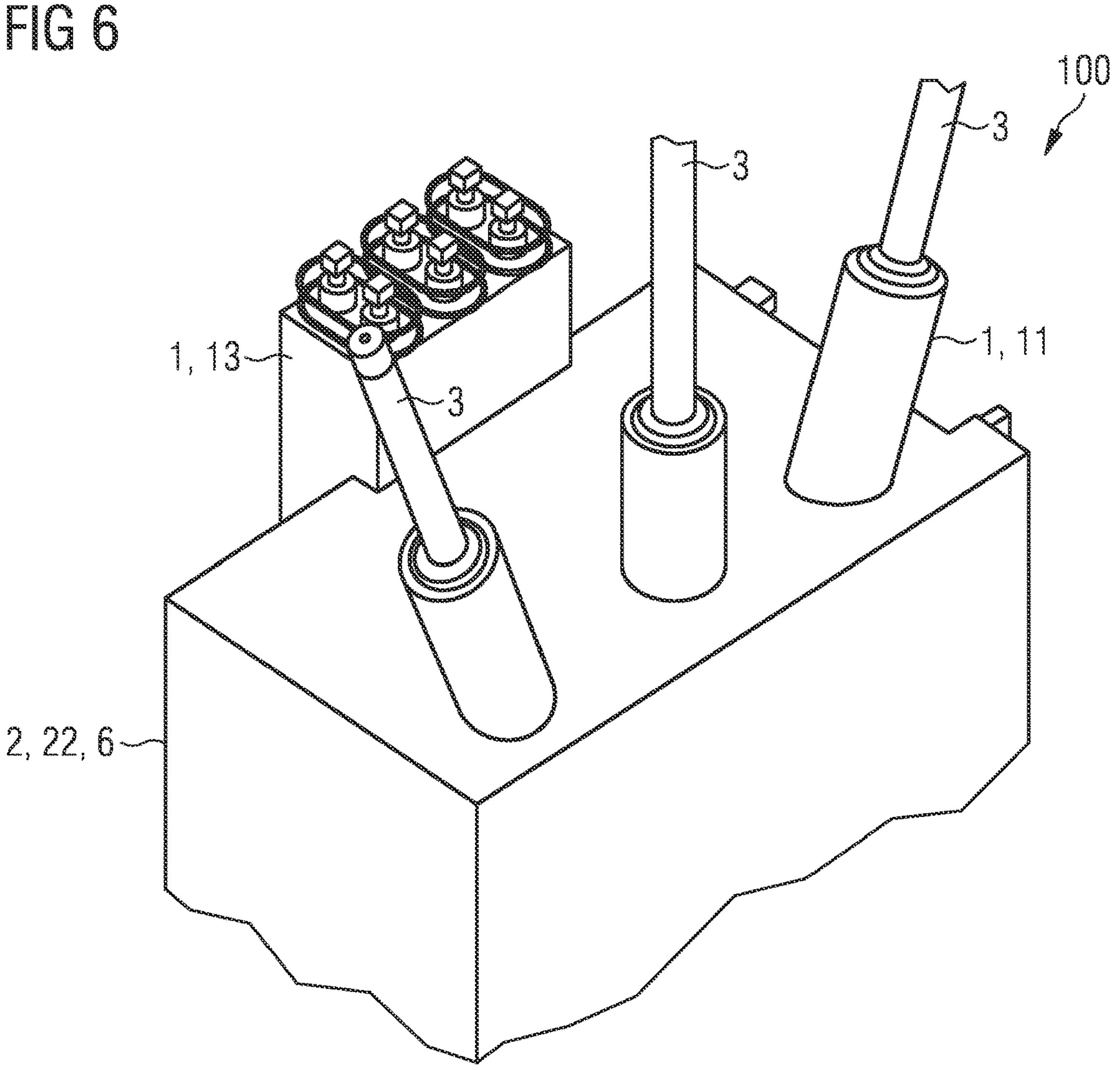
FIG. 6 is a schematic perspective view of an exemplary embodiment of an electric system described herein.

In FIG. 6, another exemplary embodiment of the system 100 is shown. The electric component 2 is, for example, a shunt reactor 22, but may also be a transformer 21, not shown.

There is a plurality of the housing parts 1 at a top side of the component tank 6. For example, there are three top turrets 11, each equipped with one electric line 3. Further, additionally or alternatively to the top turrets 11, there can be a cable box 13 as further housing part 1.

Otherwise, the same applies for FIG. 6 as for FIGS. 1 to 5.

Figure 7:
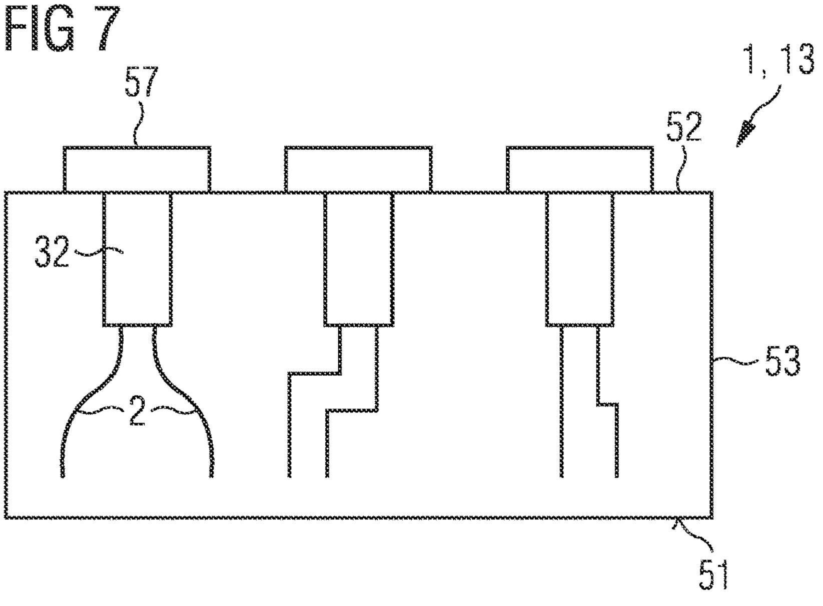
FIG. 7 is a schematic sectional view of an exemplary embodiment of a housing part described herein.

In FIG. 7, an exemplary embodiment of the housing part 1 that is configured as a cable box 13 is illustrated. The cable box 13 may be of cuboid or of approximately cuboid shape, and may have an open mounting side 51 and a closed top side 52 as well as a closed side wall 53. Optionally, there are multiple electric insulations 32 and electric lines 3 within the cable box 13. For example, a surface-to-volume ratio of the cable box 13 is 2.4 $m^{-1}$, and a ratio of the volume and a wall rupture pressure r of the cable box 13 is 1.1 $m^3$ $MPa^{-1}$.

Such a cable box 13 can be present in all the exemplary embodiments of the electric system 100.

Otherwise, the same applies for FIG. 7 as for FIGS. 1 to 6.

Figure 8:
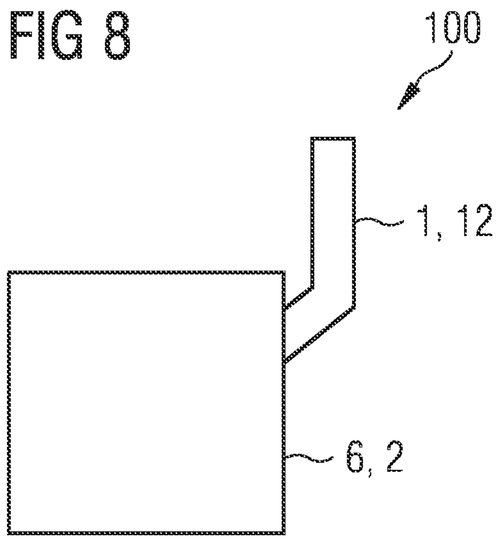
FIGS. 8 to 10 are schematic side views of exemplary embodiments of an electric system described herein.
Figure 9:
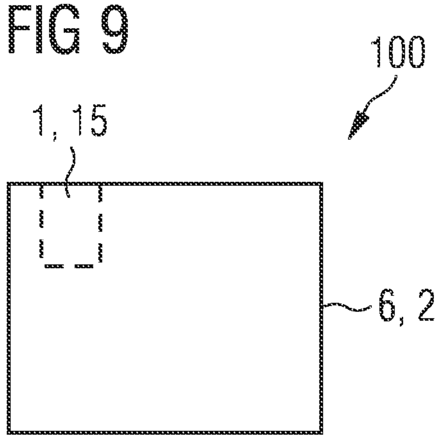
Figure 10:
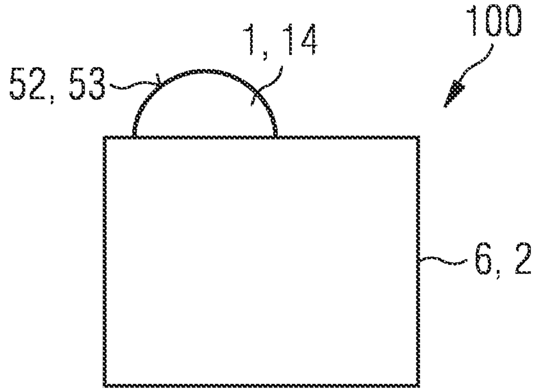

FIGS. 8 to 10 schematically illustrate further exemplary embodiments of the electric system 100 comprising exemplary housing parts 1.

According to FIG. 8, the housing part 1 is configured as a side turret 12 located at a side wall of the component tank 6. Such a side turret 12 can be present in all the exemplary embodiments of the electric system 100, for example, additionally or alternatively to the top turret 11. Otherwise, the same applies for FIG. 8 as for FIGS. 1 to 7.

According to FIG. 9, the housing part 1 is configured as a cable termination 15. For example, the cable termination 15 is located within the component tank 6, but could alternatively also be located at a side wall or at a top of the component tank 6. Such a cable termination 15 can be present in all the exemplary embodiments of the electric system 100. Otherwise, the same applies for FIG. 9 as for FIGS. 1 to 8.

According to FIG. 10, the housing part 1 is configured as an on-load tap charger 14. For example, the on-load tap charger 14 is located at a top of the component tank 6. Such an on-load tap charger 14 can be present in all the exemplary embodiments of the electric system 100. Otherwise, the same applies for FIG. as for FIGS. 1 to 9.

As in all other exemplary embodiments, the top side 52 and the side wall 53 may merge to be a single surface of the housing part. Optionally, as shown in FIG. 10, the top side 52 and the side wall 53 may be fashioned together as a dome, for example, as a hollow hemisphere.

Figure 11:
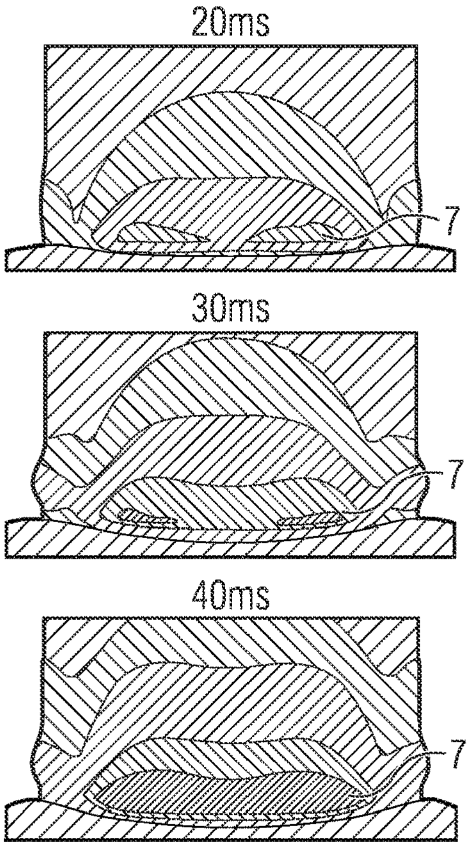
FIGS. 11 and 12 are schematic representations of time vs. pressure dependencies in housing parts.
Figure 12:
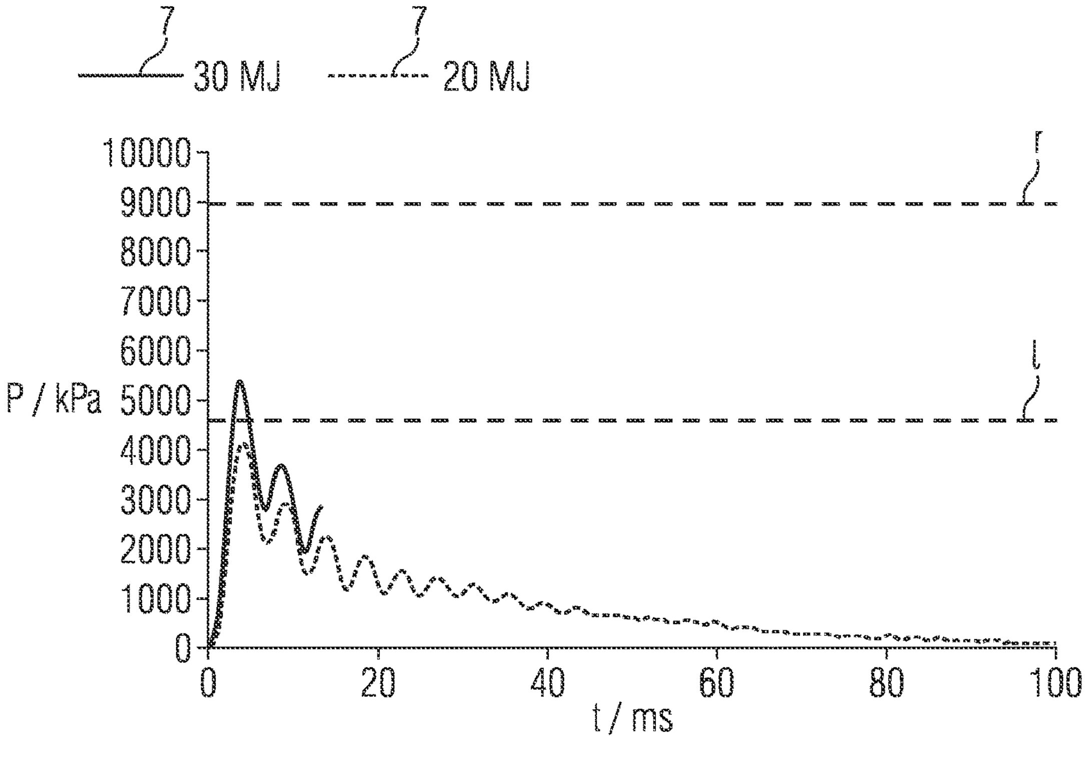

In FIGS. 11 and 12, an exemplary pressure rise 7 is characterized. As illustrated in FIG. 11, the pressure rise 7 and the associated electric arc may build up on a time scale of about 40 ms. Hence, in a closed fixed volume a maximum pressure would occur not before 40 ms after the electric arc has initiated. In other words, in the volume of the turret alone, with no tank attached, the maximum pressure in the turret would occur after 40 ms; however, this duration will also depend on the actual arcing duration.

As can be seen from FIG. 12, a pressure P in the housing part 7 quickly rises and reaches a maximum on a time scale of 5 ms to 10 ms, and then declines. This comparably rapid decline is caused by the pressure release through the open mounting side 51 into the component tank 6.

The pressure rises 7 in FIG. 12 are caused by electric arcs having an energy of 20 MJ and 30 MJ, respectively. Such fast rising high-energy electric arcs exceeding energies of, for example, 15 MJ can otherwise be very destructive in high-voltage applications.

Based on the turret 11 of FIGS. 4 and 5, the housing part 1 has a wall rupture pressure r of 9 MPa. However, a leakage pressure I, at which minor and short-term leakage of the liquid 4 may occur in a region of the flanges 54, 55, 56, 58 in case of high-energetic electric arcs of more than 30 MJ, is lower and amounts to 4.6 MPa.

Hence, the housing part 1 in the electric system 100 described herein can withstand high-energetic electric arcs.

The disclosure described here is not restricted by the description given with reference to the exemplary embodiments. Rather, the disclosure encompasses any novel feature and any combination of features, including in particular any combination of features in the claims, even if this feature or this combination is not itself explicitly indicated in the claims or exemplary embodiments.

LIST OF REFERENCE SIGNS

1 housing part
11 turret, top type
12 turret, side type
13 cable box
14 on-load tap charger
cable termination
2 electric component
21 transformer
22 shunt reactor
27 bushing
28 shield of the bushing
3 electric line
31 end of the electric line
32 electric insulation
33 electrically conductive core
4 liquid
44 valve
50 element of the housing part
51 open mounting side
52 top side
53 side wall
54 intermediate flange
55 bottom flange
56 top flange
57 cover
58 cover flange
59 lead-through opening
6 component tank
61 component interior line
62 component base element
7 pressure rise
8 electric arc
91 bolt
92 O-ring
100 electric system
D diameter of the housing part
I leakage pressure
L length of the housing part
P pressure
r wall rupture pressure
t time

The invention claimed is:

1. A housing part, configured to be connected to an electric component, configured to house an electric line, and configured to be filled with a liquid, wherein the housing part comprises an electrically conductive material, wherein the housing part has an open mounting side to be connected to the electric component, a surface-to-volume ratio of the housing part being at least 3 $m^{-1}$ and is at most 9 $m^{-1}$, and a ratio of a volume and a wall rupture pressure of the housing part being:

between 0.04 $m^3$ $MPa^{-1}$ and 0.6 $m^3Mpa^{-1}$ inclusive if the housing part is a straight turret, between 0.4 $m^3$ $MPa^{-1}$ and 1.5 $m^3$ $MPa^{-1}$ inclusive if the housing part is an external or a side turret, between 0.1 $m^3$ $MPa^{-1}$ and 1 $m^3$ $MPa^{-1}$ inclusive if the housing part is a cable box.

2. The housing part of claim 1, formed as one of a straight turret and an external turret, the housing part configured to be added to a transformer or to a shunt reactor as the electric component.

3. The housing part of claim 1, wherein the housing part comprises a top side and a side wall configured to the top side and the open mounting side, wherein the side wall is of a metal having a modulus of elasticity of at least 150 GPa at room temperature, and wherein a wall thickness of the side wall is at least 6 mm.

4. The housing part of claim 3, wherein the side wall is composed of at least two elements, said at least two elements being connected by at least two intermediate flanges located along the side wall between the top side and the open mounting side, and wherein the at least two intermediate flanges mechanically strengthen the side wall.

5. The housing part of claim 1, wherein a diameter (D) and a length (L) of housing part are between 0.3 m and 7 m inclusive, wherein a volume of a component tank is between 12 $m^3$ and 170 $m^3$ inclusive, and wherein the liquid that fills the housing part is transformer oil.

6. The housing part of claim 1, wherein the housing part further comprises a bottom flange surrounding the open mounting side, wherein the housing part is configured to be mounted to a component tank by means of the bottom flange.

7. The housing part of claim 1, wherein the housing part further comprises a top flange on a side of a side wall remote from the open mounting side, wherein a cover of the housing part that forms the top side comprises a cover flange, wherein the cover is fastened to the side wall by means of the top flange and the cover flange, wherein the cover comprises a lead-through opening, and wherein the electric line is fed into the housing part through the lead-through opening.

8. An electric system, comprising:

a housing part, configured to be connected to an electric component, configured to house an electric line, and configured to be filled with a liquid, wherein the housing part comprises an electrically conductive material, wherein the housing part has an open mounting side to be connected to the electric component, a surface-to-volume ratio of the housing part being at least 3 $m^{-1}$ and is at most 9 $m^{-1}$, and a ratio of a volume and a wall rupture pressure of the housing part being:

between 0.04 $m^3$ $MPa^{-1}$ and 0.6 $m^3Mpa^{-1}$ inclusive if the housing part is a straight turret, between 0.4 $m^3$ $MPa^{-1}$ and 1.5 $m^3$ $MPa^{-1}$ inclusive if the housing part is an external or a side turret, between 0.1 $m^3$ $MPa^{-1}$ and 1 $m^3$ $MPa^{-1}$ inclusive if the housing part is a cable box; and an electric component having a component tank, wherein the housing part is mounted to the component tank by the open mounting side so that an interior of the component tank is connected with an interior of the housing part at the open mounting side, and wherein a volume of the component tank exceeds the volume of the housing part by at least a factor of 3.

9. The electric system of claim 8, wherein the housing part comprises a top side opposite the open mounting side and a side wall connecting the top side and the open mounting side, wherein the side wall is of a metal having a modulus of elasticity of at least 150 GPa at room temperature, and wherein a wall thickness of the side wall is at least 6 mm.

10. The electric system of claim 9, wherein the side wall is composed of at least two elements, said at least two elements being connected by means of at least two intermediate flanges located along the side wall between the top side and the open mounting side, and wherein the at least two intermediate flanges mechanically strengthen the side wall.

11. The electric system according to claim 10, wherein a bushing comprises a shield that clutches an end of the electric line, wherein at least one of the at least two intermediate flanges runs around at least one of the bushing and the shield on an exterior face of the side wall.

12. The electric system according to claim 10, wherein at least one of the at least two intermediate flanges, a bottom flange and the component tank, and the top flange and a cover flange are flanged together with a tightening torque of at least 1 kNm, and wherein at least one of a ratio of a thickness of the at least two intermediate flanges and the wall thickness of the side wall, a ratio of a thickness of the top flange and the wall thickness of the side wall, a ratio of a thickness of the bottom flange and the wall thickness of the side wall, and a ratio of a thickness of the cover flange and the wall thickness of the side wall is at least 5.

13. The electric system according to claim 9, wherein the housing part further comprises a top flange on a side of the side wall remote from the open mounting side, wherein a cover of the housing part that forms the top side comprises a cover flange, wherein the cover is fastened to the side wall by means of the top flange and the cover flange, wherein the cover comprises a lead-through opening, the electric line is fed into the housing part through the lead-through opening.

14. The electric system according to claim 8, wherein the electric component is a high-power transformer or a shunt reactor, wherein the housing part houses the electric line that is connected to a bushing of the electric component.

15. The electric system according to claim 14, wherein the bushing protrudes the component tank and terminates within the housing part.

16. The electric system according to claim 8, wherein a diameter (D) and a length (L) of the housing part are between 0.3 m and 7 m inclusive, wherein the volume of the component tank is between 12 $m^3$ and 170 $m^3$ inclusive, and wherein the liquid that fills the housing part and also the component tank is transformer oil.

17. The electric system according to claim 8, wherein the housing part further comprises a bottom flange surrounding the open mounting side, wherein the housing part is mounted to the component tank by means of the bottom flange.

18. An operating method for an electric system comprising:

a housing part, configured to be connected to an electric component, configured to house an electric line, and configured to be filled with a liquid, wherein the housing part comprises an electrically conductive material, wherein the housing part has an open mounting side to be connected to the electric component, a surface-to-volume ratio of the housing part being at least 3 $m^{-1}$ and is at most 9 $m^{-1}$, and a ratio of a volume and a wall rupture pressure of the housing part being:

between 0.04 $m^3$ $MPa^{-1}$ and 0.6 $m^3Mpa^{-1}$ inclusive if the housing part is a straight turret, between 0.4 $m^3$ $MPa^{-1}$ and 1.5 $m^3$ $MPa^{-1}$ inclusive if the housing part is an external or a side turret, between 0.1 $m^3$ $MPa^{-1}$ and 1 $m^3$ $MPa^{-1}$ inclusive if the housing part is a cable box; and an electric component having a component tank, the housing part being mounted to the component tank by the open mounting side so that an interior of the component tank is connected with an interior of the housing part at the open mounting side, and wherein a volume of the component tank exceeds the volume of the housing part by at least a factor of 3, the method comprising:

absorbing a pressure rise due to an electric arc occurring in the housing part;

leading the pressure rise from the housing part into the component tank through the open mounting side; and deforming the component tank upon receiving the pressure rise to contain the pressure rise.

19. The method according to claim 18, wherein a travelling time of the pressure rise from a location of the electric arc to the open mounting side within the housing part is smaller than a full build-up time of the pressure rise.

20. The method according to claim 18, wherein the electric arc occurs at a bushing, at a shield and/or at a cable.

* * * * *